(12) United States Patent  
Otsuki

(10) Patent No.: US 9,709,879 B2  
(45) Date of Patent: Jul. 18, 2017

(54) PROJECTOR HAVING A LENS CAP WITH A FINGER PLACEMENT PORTION

(71) Applicant: Seiko Epson Corporation, Tokyo (JP)

(72) Inventor: Nobuyuki Otsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 14/731,570

(22) Filed: Jun. 5, 2015

(65) Prior Publication Data

US 2016/0011494 A1 Jan. 14, 2016

(30) Foreign Application Priority Data

Jul. 8, 2014 (JP) .................................. 2014-140252

(51) Int. Cl.
   *G03B 21/00* (2006.01)
   *G03B 21/14* (2006.01)

(52) U.S. Cl.
   CPC ........... *G03B 21/145* (2013.01); *G03B 21/00* (2013.01); *G03B 21/14* (2013.01)

(58) Field of Classification Search
   CPC ....... G03B 21/145; G03B 21/14; G03B 21/00
   See application file for complete search history.

(56) References Cited

U.S. PATENT DOCUMENTS

2015/0160534 A1* 6/2015 Chang ................. G03B 11/045  
359/511

FOREIGN PATENT DOCUMENTS

JP          2006301227 A   * 11/2006   ............. G03B 21/00  
JP          2009-86199 A      4/2009

* cited by examiner

*Primary Examiner* — Sultan Chowdhury  
*Assistant Examiner* — Magda Cruz  
(74) *Attorney, Agent, or Firm* — ALG Intellectual Property, LLC

(57) ABSTRACT

A projector includes a projection optical apparatus including a projection lens that projects an image and a lens barrel that accommodates the projection lens, an exterior enclosure that accommodates the projection optical apparatus, and a lens cap that protects the projection lens. The lens cap has a body portion that covers at least part of the projection lens exposed through an opening formed in one of the exterior enclosure and a tab that is formed integrally with the body portion and engages with an inner circumferential edge of the opening to lock the lens cap in the opening, and the body portion has finger placement portions (first finger placement portion and second finger placement portion) on which fingers are placed in a direction roughly parallel to a direction in which the tab having engaged with the inner circumferential edge of the opening moves away from the inner circumferential edge.

15 Claims, 10 Drawing Sheets

PROJECTOR HAVING A LENS CAP WITH A FINGER PLACEMENT PORTION

BACKGROUND

1. Technical Field

The present invention relates to a projector.

2. Related Art

There is a known projector including a lens cover that protects a projection lens that projects an image. As an example of the projector, there is a proposed projector including a lens cover attached to and detached from an exterior enclosure (see JP-A-2009-086199, for example).

In the projector described in JP-A-2009-086199, the exterior enclosure has a locking portion (groove), and the lens cover has a lens cover body and a sliding member slidably attached to the lens cover body. The lens cover body has a protective surface that protects the projection lens, an upper surface portion and a lower surface portion that stand toward the exterior enclosure along the optical axis of the projection lens, and tabs that protrude from the upper and lower surface portions toward the locking portion (groove). The sliding member has an operation portion and an extending portion, and the extending portion has the tab described above that protrudes from the lower surface portion toward the locking portion (groove). In the thus configured lens cover, when an operator operates the operation portion, the tab of the extending portion moves in the direction away from the locking portion (groove). The configuration described above allows the lens cover to be freely attached to and detached from the exterior enclosure, whereby the projection lens is protected when the lens cover is attached to the exterior enclosure.

In the projector described in JP-A-2009-086199, however, the lens cover (lens cap) is formed of separate members, that is, the lens cover body and the sliding member, the latter of which is formed of the operation portion and extending portion having the tab. That is, since the lens cover has a complicated configuration, it is undesirably difficult to attach and detach the lens cover.

SUMMARY

An advantage of some aspects of the invention is to provide a projector including a lens cap having a simple configuration and allowed to be readily attached to and detached from the projector.

A projector according to a first aspect of the invention includes a projection optical apparatus including a projection lens that projects an image and a lens barrel that accommodates the projection lens, an exterior enclosure that accommodates the projection optical apparatus, and a lens cap that protects the projection lens. The lens cap has a body portion that covers at least part of the projection lens exposed through an opening formed in one of the exterior enclosure and the lens barrel and a tab that is formed integrally with the body portion and engages with an inner circumferential edge of the opening to lock the lens cap in the opening, and the body portion has a finger placement portion on which a finger is placed in a direction roughly parallel to a direction in which the tab having engaged with the inner circumferential edge of the opening moves away from the inner circumferential edge.

The lens cap described above can, for example, be a unitary molded lens cap made of polypropylene or any other synthetic resin and having a property that causes the lens cap to bend when constant pressure is applied thereto.

According to the first aspect described above, in a case where the lens cap is attached into the opening, an operator places a finger on the finger placement portion of the lens cap to apply predetermined pressure to the lens cap. The operator can thus bend the lens cap in the direction in which the operator places the finger on the finger placement portion (hereinafter referred to as finger placement direction). As a result, the tab can be moved in the direction in which it moves away from the inner circumferential edge of the opening, whereby the tab can be readily caused to disengage from the inner circumferential edge of the opening. The lens cap can therefore be readily detached from the opening in the exterior enclosure or the lens barrel of the projector.

On the other hand, when the lens cap is fit into the opening, the tab is bent and engages with the inner circumferential edge of the opening, whereby the lens cap can be readily attached into the opening.

Further, since the body portion and the tab of the lens cap are formed integrally with each other, the number of parts, for example, can be reduced as compared with the lens cap of the projector described in JP-A-2009-086199. The productivity of the lens cap can therefore be improved, whereby the manufacturing cost of the projector can be lowered.

In the first aspect described above, it is preferable that the body portion has a ring-shaped portion that is formed along the inner circumferential edge of the opening and inserted into the opening when the lens cap is fit into the opening, that the tab is formed in the ring-shaped portion, and that the ring-shaped portion has cutouts in positions that sandwich the tab.

According to the first aspect described above, since the cutouts are provided in the positions on the ring-shaped portion, with which the tab is provided, which sandwich the tab, the tab can be readily bent as compared with a case where no cutouts are provided. As a result, when the lens cap is attached into the opening, the tab is allowed to readily engage with the inner circumferential edge of the opening. That is, the lens cap can be more readily attached to and detached from the exterior enclosure.

Further, since the ring-shaped portion is formed along the inner circumferential edge of the opening, the ring-shaped portion of the lens cap is allowed to come into contact with the inner circumferential edge of the opening formed in the exterior enclosure or the lens barrel when the lens cap is attached into the opening. As a result, positional misalignment of the lens cap with the exterior enclosure or the lens barrel can be avoided.

In the first aspect described above, it is preferable that a rib that protrudes outward from the ring-shape portion is formed on an edge portion on the side opposite the tab among edge portions that form the cutouts.

According to the first aspect described above, the rib comes into contact with the inner circumferential edge of the opening when the lens cap is attached into the opening. The rib allows adjustment of engaging force (locking force) that causes the tab to engage with a standing portion. As a result, the lens cap can be held in the opening with appropriate pressure, whereby the lens cap can be more readily attached to and detached from the exterior enclosure or the lens barrel.

In the first aspect described above, it is preferable that the projector further includes a standing portion which is located along the inner circumferential edge of the opening and with which the tab engages.

According to the first aspect described above, the tab of the lens cap can be more readily hooked to the standing portion than in a case where the tab is caused to engage with the inner circumferential edge of the opening. Further, degradation in excellent exterior appearance of the projector that may occur when the lens cap is detached can be suppressed as compared with a case where a recess to which the tab of the lens cap is hooked is provided at the inner circumferential edge of the opening.

In the first aspect described above, it is preferable that the tab includes a first tab disposed in an upper portion of the body portion and a second tab disposed in a lower portion thereof in a case where the projector is installed on a predetermined installation surface and the lens cap is fit into the opening, and that the finger placement portion includes a first finger placement portion disposed in the upper portion of the body portion and a second finger placement portion disposed in the lower portion thereof in the case where the projector is installed on the predetermined installation surface and the lens cap is fit into the opening.

According to the first aspect described above, since the first finger placement portion and the second finger placement portion, which form the finger placement portion described above, are provided in the upper portion and the lower portion of the body portion, the operator can readily grasp the lens cap by allowing, for example, a thumb and a middle finger to sandwich the body portion. Further, when the operator places fingers on the first finger placement portion and the second finger placement portion to press the body portion, the first finger placement portion is shifted downward and the second finger placement portion is shifted upward, whereby the first tab can be shifted downward and the second tab can be shifted upward in response to the placement of the fingers on the finger placement portions and the grasp of the lens cap. The lens cap can therefore be more readily detached from the opening.

In the first aspect described above, it is preferable that the opening is so formed that the shape thereof has a lower portion larger than an upper portion in the case where the projector is installed on the predetermined installation surface, that the lens cap is shaped in accordance with the opening, and that the number of second tabs is greater than the number of first tabs.

According to the first aspect described above, when the lens cap is fit into the opening, the second tab, the number of which is greater than the number of first tabs, which engage with the inner circumferential edge of the opening in the upper portion, engages with the inner circumferential edge of the opening in the lower portion, which is wider than the upper portion, whereby the lens cap can be attached into the opening in a stable manner. On the other hand, since the first tab, the number of which is smaller than the number of second tabs, is provided in the upper portion of the body portion, which is narrower than the lower portion thereof, the first tab, which is located in the upper portion, can be more readily caused to disengage than the second tab, which is located in the lower portion. In the operation of detaching the lens cap by causing the lens cap to pivot in such a way that the upper portion of the body portion moves away from the opening around a pivotal point where the lower portion of the body portion and the inner circumferential edge of the opening engage with each other, the upper portion of the lens cap is readily allowed to move away from the opening because the number of first tabs located in the upper portion is smaller than the number of second tabs. The lens cap can therefore be more readily detached from the opening.

A projector according to a second aspect of the invention includes a projection optical apparatus including a projection lens that projects an image and a lens barrel that accommodates the projection lens, an exterior enclosure that accommodates the projection optical apparatus, and a lens cap that protects the projection lens. The lens cap has a body portion that that covers at least part of the projection lens exposed through an opening formed in one of the exterior enclosure and the lens barrel and a tab that is formed integrally with the body portion and engages with an outer circumferential edge around the opening to lock the lens cap in a position according to the opening, and the body portion has a finger placement portion on which a finger is placed in a direction roughly perpendicular to a direction in which the tab having engaged with the outer circumferential edge around the opening moves away from the outer circumferential edge in a view in a direction opposite the direction in which the image is projected through the projection lens covered with the body portion.

The lens cap described above can, for example, be a unitary molded lens cap made of polypropylene or any other synthetic resin and having a property that causes the lens cap to bend when constant pressure is applied thereto.

According to the second aspect described above, in a case where the lens cap is attached into the opening, an operator places a finger on the finger placement portion of the lens cap to apply predetermined pressure to the lens cap. The operator can thus bend the lens cap in the direction in the finger placement direction. As a result, the tab can be moved in the direction in which it moves away from the outer circumferential edge around the opening, whereby the tab can be readily caused to disengage from the outer circumferential edge around the opening. The lens cap can therefore be readily detached from the opening in the exterior enclosure or the lens barrel of the projector.

On the other hand, when the lens cap is pressed against the outer circumferential edge around the opening, the tab is bent and engages with the outer circumferential edge around the opening, whereby the lens cap can be readily attached into the opening.

Further, since the lens cap is a unitary molded part, the number of parts, for example, can be reduced as compared with the lens cap of the projector described in JP-A-2009-086199. The productivity of the lens cap can therefore be improved, whereby the manufacturing cost of the projector can be lowered.

In the first and second aspects described above, it is preferable that the finger placement portion has a recess that is recessed in the direction in which a finger is placed on the finger placement portion.

According to the aspect described above, the recess formed in the finger placement portion allows a finger to be readily placed on the finger placement portion and the finger to apply pressure in the finger placement direction, whereby the lens cap can be readily bent and the lens cap can be readily detached from the opening.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
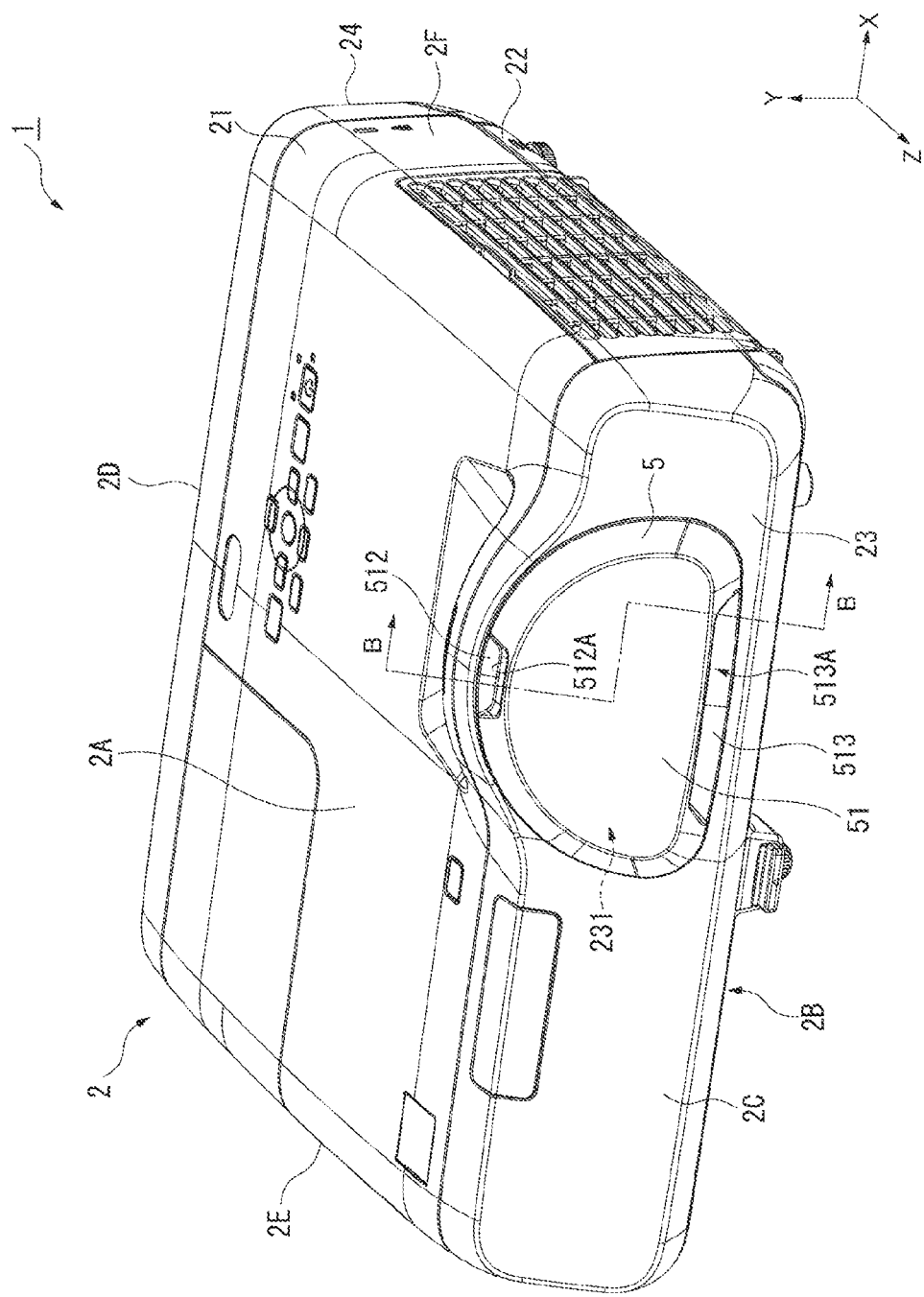
FIG. 1 is a perspective view of a projector according to a first embodiment of the invention viewed from the front side.

A first embodiment of the invention will be described below with reference to the drawings.
Outline of Projector FIG. 1 is a perspective view of a projector 1 according to the present embodiment viewed from the front side.

The projector 1 according to the present embodiment modulates light outputted from a light source apparatus 41, which will be described later, to form an image according to image information and enlarges and projects the image on a projection surface, such as a screen. The projector 1 includes an exterior enclosure 2, an apparatus body 3 (see FIG. 2), which is accommodated in the exterior enclosure 2, and a lens cap 5, which is detachably attached to the exterior enclosure 2, as shown in FIG. 1.

The projector 1 is so configured that it can be used not only in an upright attitude in which the projector 1 is so installed that a bottom surface portion 2B, which will be described later, faces a predetermined installation surface but also in an inverted attitude in which the projector 1 is installed upside down or in the inverted upright attitude.
Configuration of Exterior Enclosure The exterior enclosure 2 has a roughly box-like shape as a whole and is made of a synthetic resin in the present embodiment. The exterior enclosure 2 is a combination of an upper case 21, a lower case 22, a front case 23, and a rear case 24.

Among them, the upper case 21 forms a top surface portion 2A and part of left and right side surface portions 2E, 2F of the exterior enclosure 2. The lower case 22 forms the bottom surface portion 2B and part of the left and right side surface portions 2E, 2F of the exterior enclosure 2.

Further, the front case 23 forms a front surface portion 2C of the exterior enclosure 2, and the rear case 24 forms a rear surface portion 2D.

In the following figures and description, a Z direction represents the traveling direction (projection direction) of light projected from a projection optical apparatus 46, which will be described later, and X and Y directions represent directions perpendicular not only to the Z direction but also to each other. The Y direction represents an upward direction (that is, direction from bottom surface portion 2B toward top surface portion 2A of exterior enclosure 2) that is opposite to the vertical direction in a case where the projector 1 is so installed that the Z direction extends along the horizontal direction in a plan view, and the X direction represents a direction from left to right when the projector 1 is viewed from the Z-direction side (side toward which light travels).

Among the cases described above, the front case 23, which forms the front surface portion 2C, has an opening 231 having a roughly semicircular shape. The opening 231 is so sized that it allows light having exited out of a projection lens 461 to be projected on the projection surface. The lens cap 5 is detachably attached into the opening 231. The configuration of the front case 23 and the lens cap 5 will be described later in detail.
Configuration of Apparatus Body FIG. 2 is a diagrammatic view showing the configuration of the apparatus body 3 provided in the exterior enclosure 2.

Figure 2:
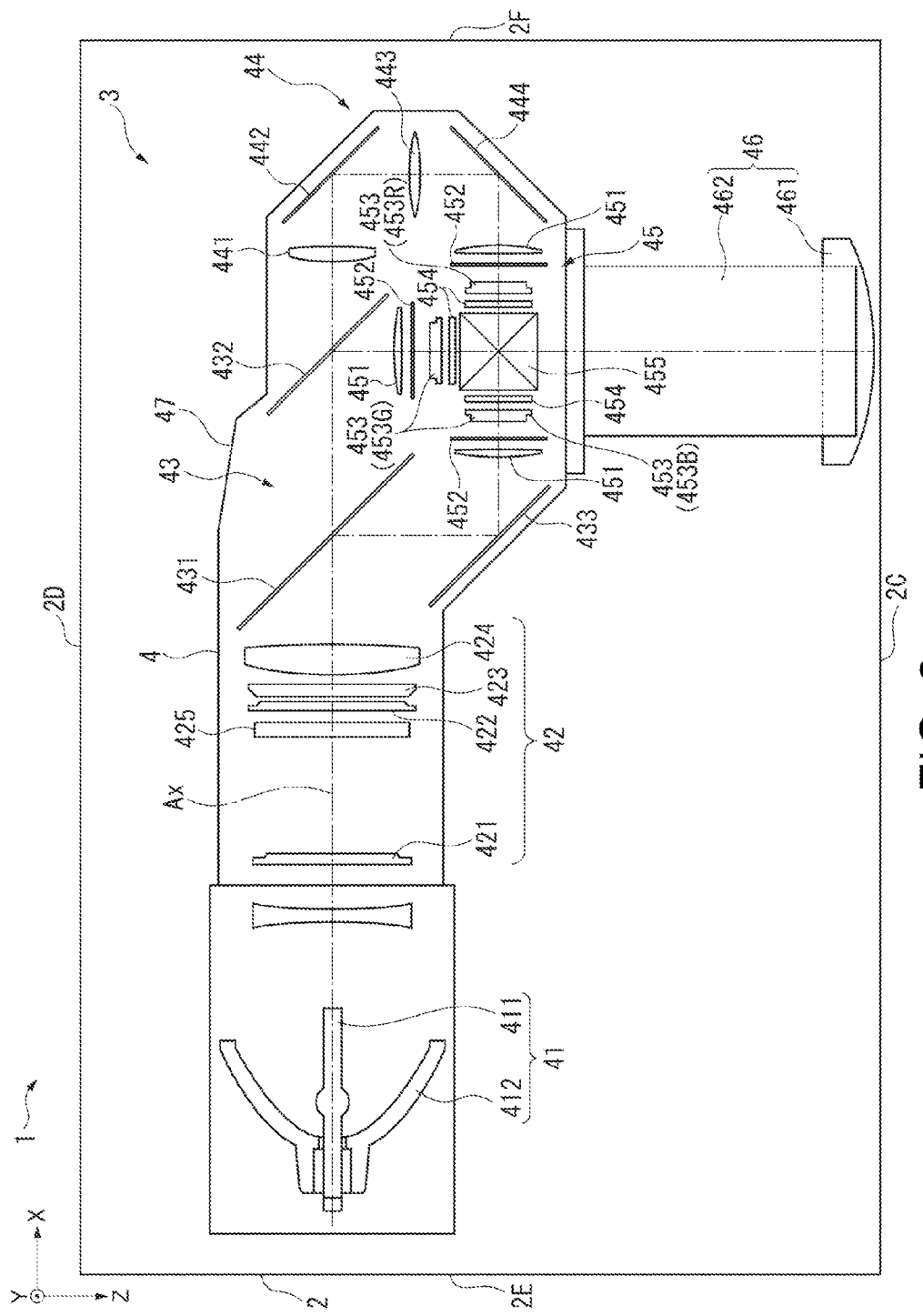
FIG. 2 is a diagrammatic view showing an optical system of the projector according to the first embodiment.

The apparatus body 3 includes an optical unit 4, which forms and projects an image, as shown in FIG. 2. The apparatus body 3 includes, although not shown, a voice output unit, a control unit that controls the entire projector 1, a power supply unit that supplies the components of the projector 1 with electric power, and a cooling unit that cools objects to be cooled, as well as the optical unit 4.
Configuration of Optical Unit The optical unit 4 forms and projects an image according to image information under the control of the control unit, which is not shown. The optical unit 4 includes a light source apparatus 41, an illumination optical apparatus 42, a color separation apparatus 43, a relay apparatus 44, an electro-optical apparatus 45, a projection optical apparatus 46, and an optical part enclosure 47, which supports the optical apparatus described above.

The light source apparatus 41 includes a light source lamp 411 and a reflector 412 and outputs a light flux to the illumination optical apparatus 42.

The illumination optical apparatus 42 homogenizes the illuminance of the light flux outputted from the light source apparatus 41 in a plane perpendicular to the central axis of the light flux. The illumination optical apparatus 42 includes a first lens array 421, a light attenuator 425, a second lens array 422, a polarization conversion element 423, and a superimposing lens 424, which are sequentially arranged from the side on which the light from the light source apparatus 41 is incident.

The color separation system 43 separates the light flux incident from the illumination optical apparatus 42 into three color light fluxes, red (R) light, green (G) light, and blue (B) light. The color separation system 43 includes dichroic mirrors 431 and 432 and a reflection mirror 433.

The relay apparatus 44 is provided along the optical path of the red light, among the three separated color fluxes, the optical path of which is longer than those of the other color light fluxes. The relay apparatus 44 includes a light-incident-side lens 441, a relay lens 443, and reflection mirrors 442 and 444.

The electro-optical apparatus 45 modulates each of the separated color light fluxes in accordance with image information and then combines the modulated color light fluxes with one another. The electro-optical apparatus 45 includes three field lenses 451, three light-incident-side polarizers 452, three liquid crystal panels 453 as light modulators (reference character 453R, 453G, and 453B denote liquid crystal panels for red, green, and blue light fluxes), and three light-exiting-side polarizers 454, which are provided on a color light flux basis, and a cross dichroic prism 455 as a light combining optical apparatus that combines the modulated color light fluxes.

The projection optical apparatus 46 is formed as a lens unit including the projection lens 461, which enlarges and projects the combined color light (image-forming light flux) on the projection surface described above, and a lens barrel 462. The light projected out of the thus configured projection optical apparatus 46 (specifically, projection lens 461) is projected through the opening 231 (see FIG. 3) in the front case 23.

The optical part enclosure 47, although not illustrated in detail, has a part accommodation member having a groove so formed that it accommodates a variety of optical parts, a lid-shaped member that blocks a part accommodating opening formed in the part accommodation member, and a support member that supports the projection optical apparatus 46.

In the optical part enclosure 47, an illumination optical axis Ax is set, and the apparatus 41 to 46 described above are disposed in predetermined positions along the illumination optical axis Ax. Therefore, when the light source apparatus 41 is disposed in the optical part enclosure 47, the central axis of the light outputted from the light source apparatus 41 coincides with the illumination optical axis Ax.

Configuration of Front Case

Figure 3:
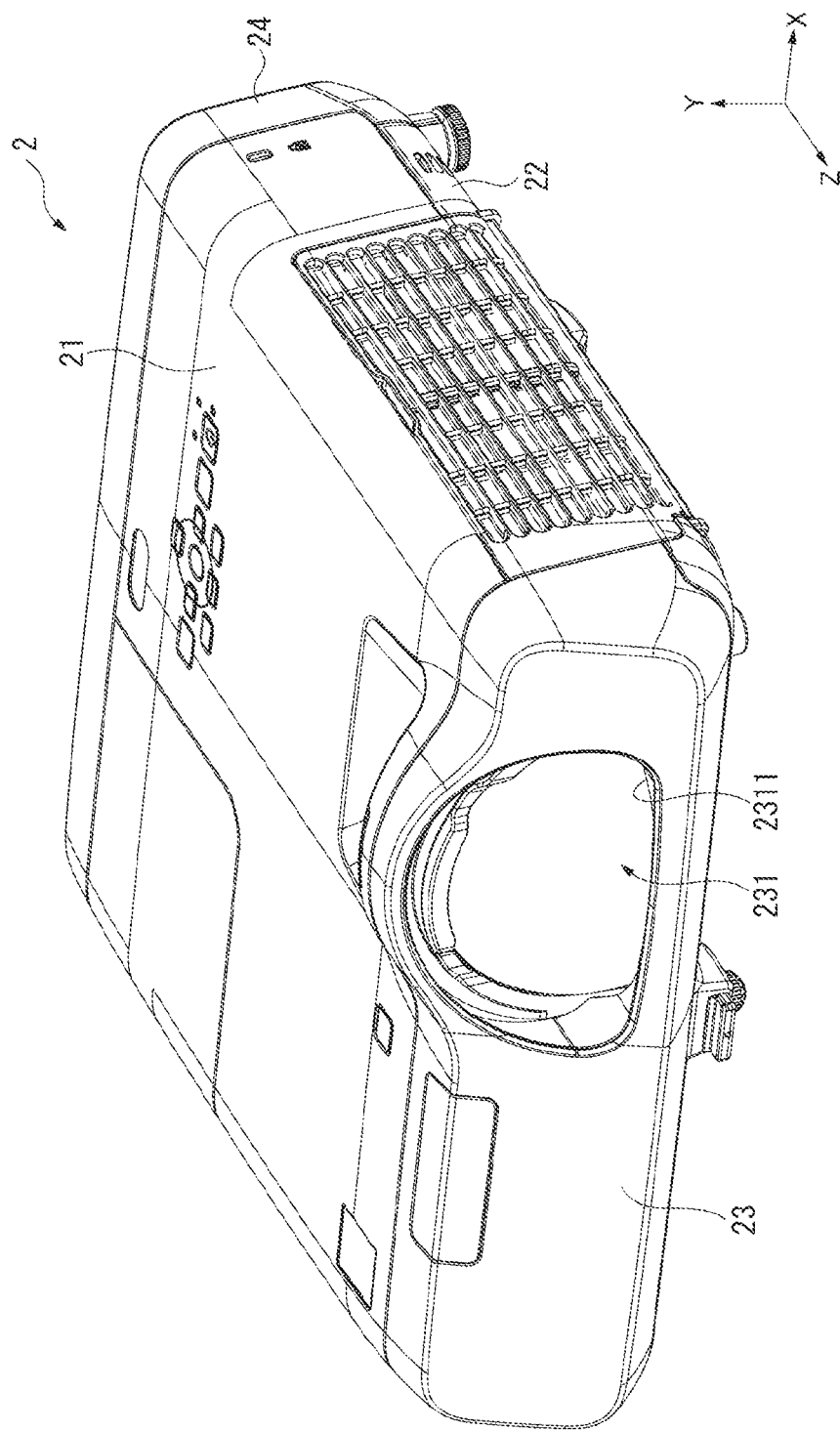
FIG. 3 is a perspective view of the projector from which a lens cap in the present embodiment is removed and which is viewed from the front side.
Figure 4:
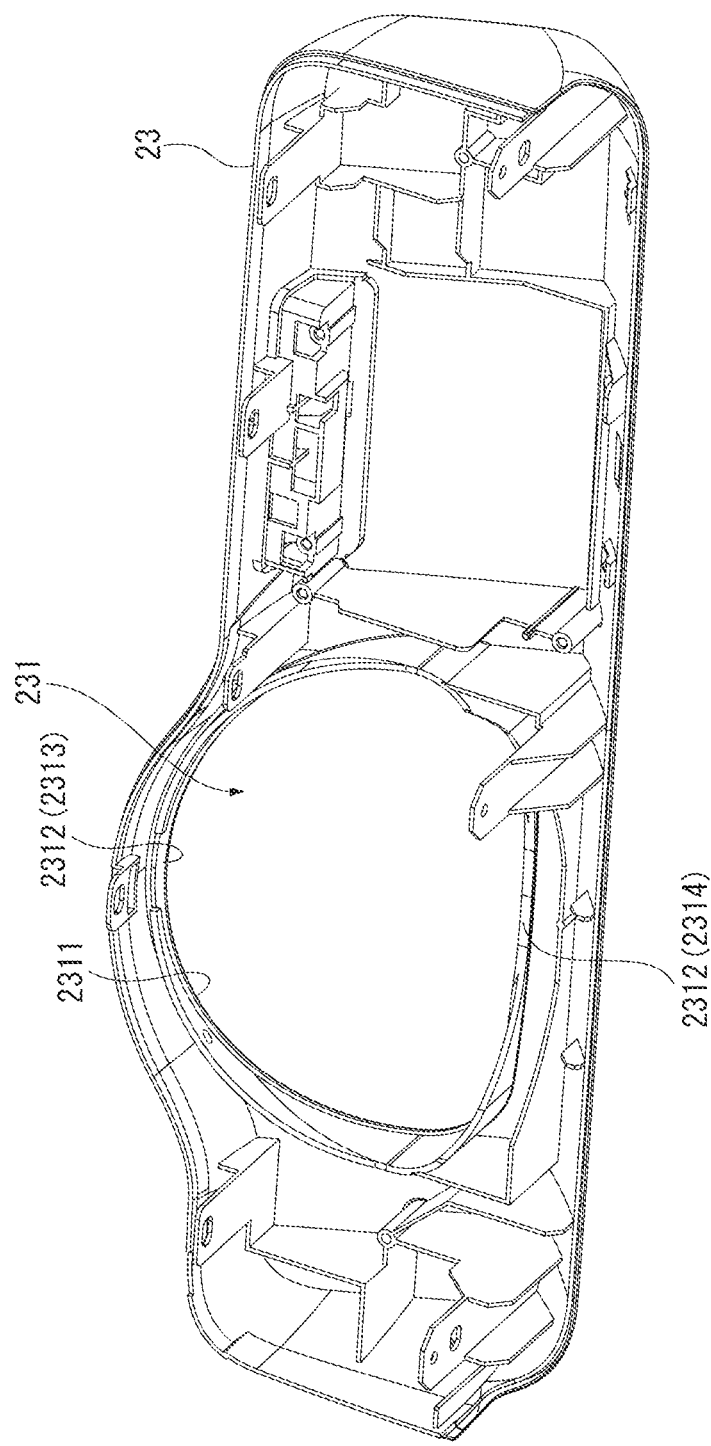
FIG. 4 is a perspective view of a front case in the first embodiment viewed from the rear side.

FIG. 3 is a perspective view of the projector 1 from which the lens cap 5 is removed and which is viewed from the side facing the front surface portion 2C. FIG. 4 is a perspective view of the front case 23 viewed from the rear side (inner side of exterior enclosure 2). In the following description, it is assumed that the Z direction coincides with the central axis of the projection optical apparatus 46, and that the X and Y directions are perpendicular not only to the Z direction but also to each other. Among the directions, the Y direction refers to a direction from below to above in a case where the projector is so installed that the Z direction extends along the horizontal direction (in the case of the upright attitude), and the X direction refers to a direction from left to right in a view from the Z-direction side.

The front case 23, which forms the exterior enclosure 2, has the opening 231, through which an image projected from the projection optical apparatus 46 described above passes, as shown in FIGS. 3 and 4. That is, the opening 231 exposes part of the projection optical apparatus 46, that is, one of the lenses that form the projection lens 461 and is located in a position closest to the Z-direction side.

The opening 231 is so sized that the dimension thereof on the side opposite the Y-direction side is greater than the dimension thereof on the Y-direction side, as shown in FIG. 3. That is, the opening 231 has a roughly semicircular shape so formed that a lower portion thereof is greater than an upper portion thereof in a case where the projector 1 is installed on the predetermined installation surface.

The front case 23 has a standing portion 2312, which stands from an inner circumferential edge 2311 of the opening 231 inward from the opening 231, and a Y-direction-side portion of the standing portion 2312 is called a first standing portion 2313 and a portion of the standing portion 2312 that is opposite the Y-direction side is called a second standing portion 2314, as shown in FIG. 4. The dimension of the first standing portion 2313 in the X direction is shorter than the dimension of the second standing portion 2314 in the X direction.

Tabs 52, 53, and 54 (see FIG. 5) of the lens cap 5, which protects the projection lens 461, engage with standing portion 2312.

Configuration of Lens Cap

The lens cap 5 is, for example, a unitary molded part made of polypropylene or any other synthetic resin and is flexible so that it bends when constant pressure is applied thereto. The lens cap 5 is so formed that it has a roughly semicircular shape in correspondence with the shape of the opening plane of the opening 231 described above and so dimensioned that the portion opposite the Y-direction side is greater than the portion on the Y-direction side, as shown in FIG. 1. That is, the lens cap 5 is dimensioned to be slightly greater than the opening 231 in the front case 23.

The thus configured lens cap 5 has a body portion 51, which covers the projection lens 461, and a first tab 52, a second tab 53, and a third tab 54, which lock the body portion 51 to the inner circumferential edge of the opening 231.

The body portion 51 has a shape in which a central portion thereof swells in the Z direction so that the central portion protrudes from an outer edge portion, as shown in FIG. 1. The body portion 51 has a first finger placement portion 512 and a second finger placement portion 513 formed in a surface 51A, which is a surface of the body portion 51 on the Z-direction side.

The first finger placement portion 512, which is one of the finger placement portions and formed in a position in the vicinity of the Y-direction-side end, has a recess 512A having a roughly arcuate shape that is recessed in the direction in which a finger (thumb, for example) is placed on the first finger placement portion 512, that is, toward the side opposite the Y-direction side.

On the other hand, the second finger placement portion 513, which is formed on the side opposite the Y-direction side, has a recess 513A having a roughly arcuate shape that is recessed in the direction in which fingers (middle finger and ring finger, for example) are placed on the second finger placement portion 513, that is, toward the Y-direction side.

Figure 5:
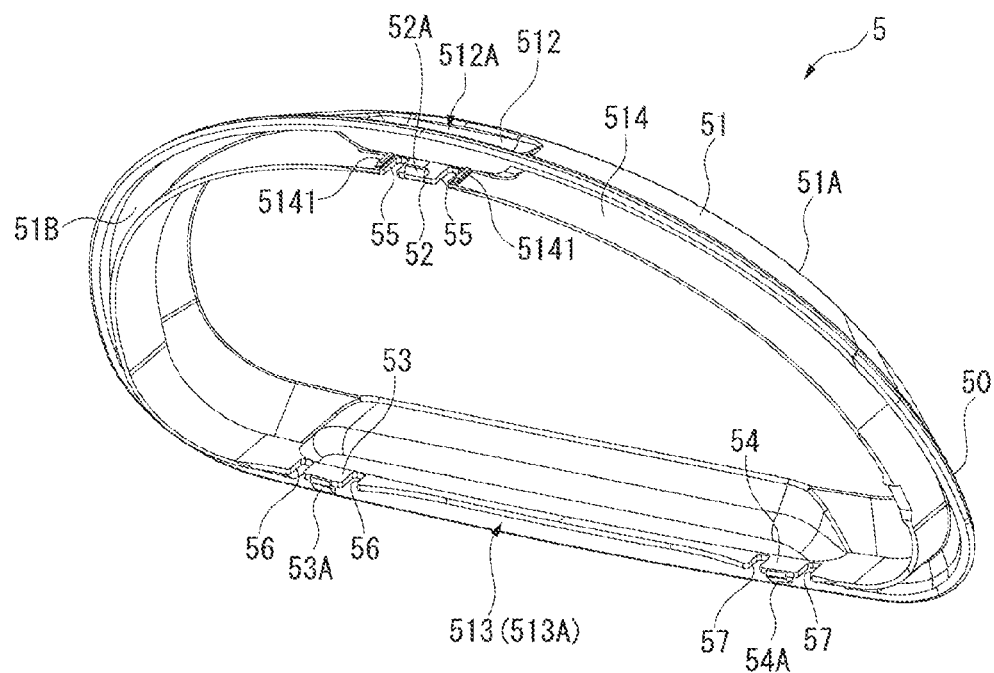
FIG. 5 is a perspective view of a lens cap in the first embodiment viewed from the rear side.
Figure 6:
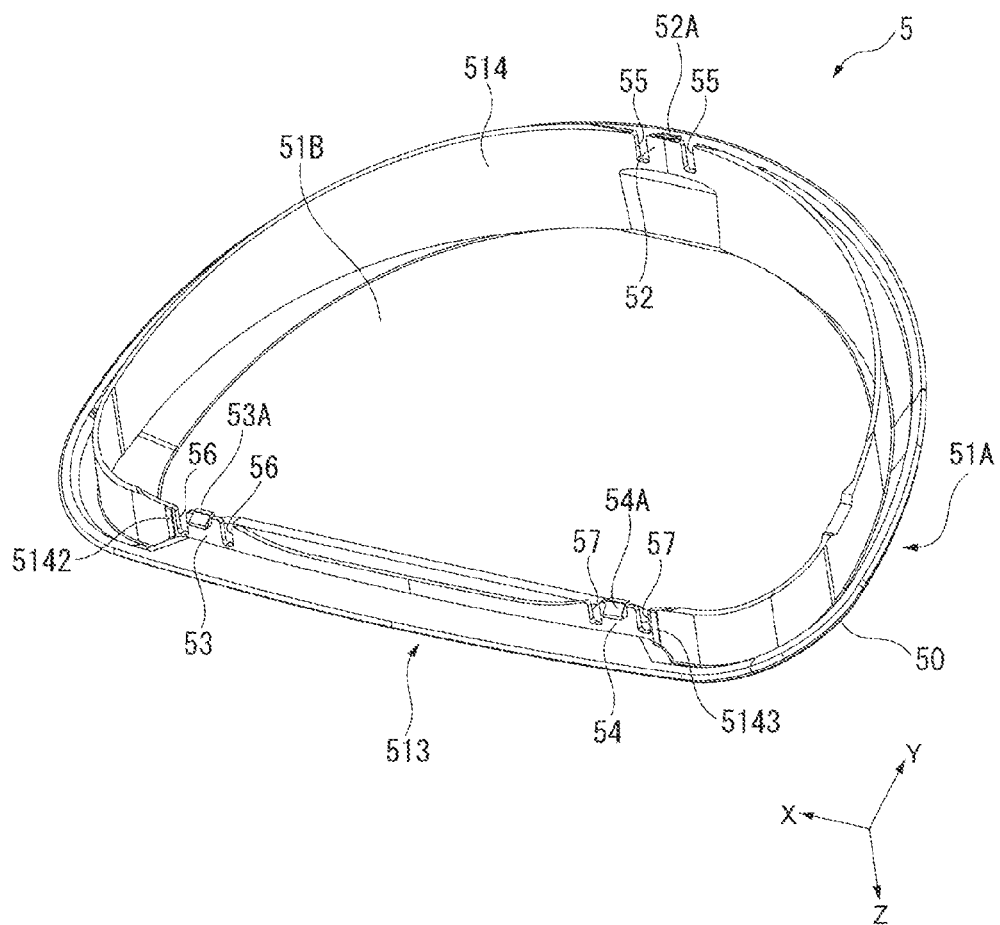
FIG. 6 is a perspective view of the lens cap in the first embodiment viewed from the lower side.

FIG. 5 is a perspective view of the lens cap 5 viewed from the side facing a rear surface 51B thereof (side facing projection lens), and FIG. 6 is a perspective view of the lens cap 5 viewed from the side facing the rear surface 51B but obliquely from the side facing the bottom surface portion 2B.

The rear surface 51B of the body portion 51 has a ring-shaped portion 514, the diameter of which is slightly smaller than that of an outer circumferential edge 50 of the body portion 51 and which protrudes along the ring shape in the direction opposite the Z direction, as shown in FIGS. 5 and 6.

The ring-shaped portion 514 is a portion inserted into the opening 231 when the lens cap 5 is fit into the opening 231. The ring-shaped portion 514 is provided with the first tab 52, the second tab 53, and the third tab 54.

The first tab 52 is formed in a Y-direction-side end portion of the ring-shaped portion 514. The first tab 52 has a hook-shaped portion 52A, which is bent outward from the ring-shaped portion 514, and the hook-shaped portion 52A engages with the first standing portion 2313 described above when the lens cap 5 is fit into the opening 231.

First cutouts 55 are formed on opposite sides of the first tab 52 and allow the first tab 52 to bend independently.

Further, first ribs 5141, each of which protrudes outward from the ring-shaped portion 514, are formed on edge portions of the ring-shaped portion 514 that are located on opposite sides of the pair of first cutouts 55, which sandwich the first tab 52, that is, on edge portions opposite the first tab 52. The first ribs 5141 come into contact with the standing portion 2312 (first standing portion 2313) when the lens cap 5 is fit into the opening 231. The first ribs 5141 allow adjustment of engaging force (locking force) that causes the first tab 52 to engage with the first standing portion 2313, whereby the lens cap 5 can be held in the opening 231 with appropriate pressure.

Each of the second tab 53 and the third tab 54 corresponds to a second tab in an embodiment of the invention. Each of the tabs 53 and 54 is formed in an end portion of the ring-shaped portion 514 on the side opposite the Y-direction side. The second tab 53 is located on the X-direction side, and the third tab 54 is located on the side opposite the X-direction side. The second tab 53 and the third tab 54 have hook-shaped portions 53A and 54A, each of which is bent outward from the ring-shaped portion 514, and the hook-shaped portions 53A and 54A engage with the second standing portion 2314 described above when the lens cap 5 is fit into the opening 231, as in the case of the first tab 52 described above.

Second cutouts 56 are formed on opposite sides of the second tab 53 and third cutouts 57 are formed on opposite sides of the third tab 54, allowing the second tab 53 and the third tab 54 to bend independently.

Further, a second rib 5142, which protrudes outward from the ring-shaped portion 514, is formed on one of edge portions that form the second cutout 56 located on the opposite side of the second tab 53 to the third tab 54, that is, on an edge portion of the ring-shaped portion 514 that is located on the side opposite the second tab 53. Similarly, a third rib 5143, which protrudes outward from the ring-shaped portion 514, is formed on one of edge portions that form the third cutout 57 located on the opposite side of the third tab 54 to the second tab 53, that is, on an edge portion of the ring-shaped portion 514 that is located on the side opposite the third tab 54. Each of the ribs 5142 and 5143 functions in the same manner as the first rib 5141 described above when the lens cap 5 is fit into the opening 231.

The first tab 52 is disposed in a position shifted from a roughly central portion of the first finger placement portion 512 toward the Y-direction side, as shown in FIGS. 1, 5, and 6. The second tab 53 is formed in a position not only in the vicinity of the X-direction-side end of the second finger placement portion 513, which is dimensioned greater than the first finger placement portion 512 in the X direction, but also on the opposite side of the second finger placement portion 513 to the Y-direction side. The third tab 54 is formed in a position not only in the vicinity of the end of the second finger placement portion 513 opposite the X-direction side but also on the opposite side of the second finger placement portion 513 to the Y-direction side. That is, the first tab 52 is located on the Y-direction side of the region where the first finger placement portion 512 is formed, and the second tab 53 and the third tab 54 are located on the opposite side of the region where the second finger placement portion 513 is formed to the Y-direction side.

Figure 7:
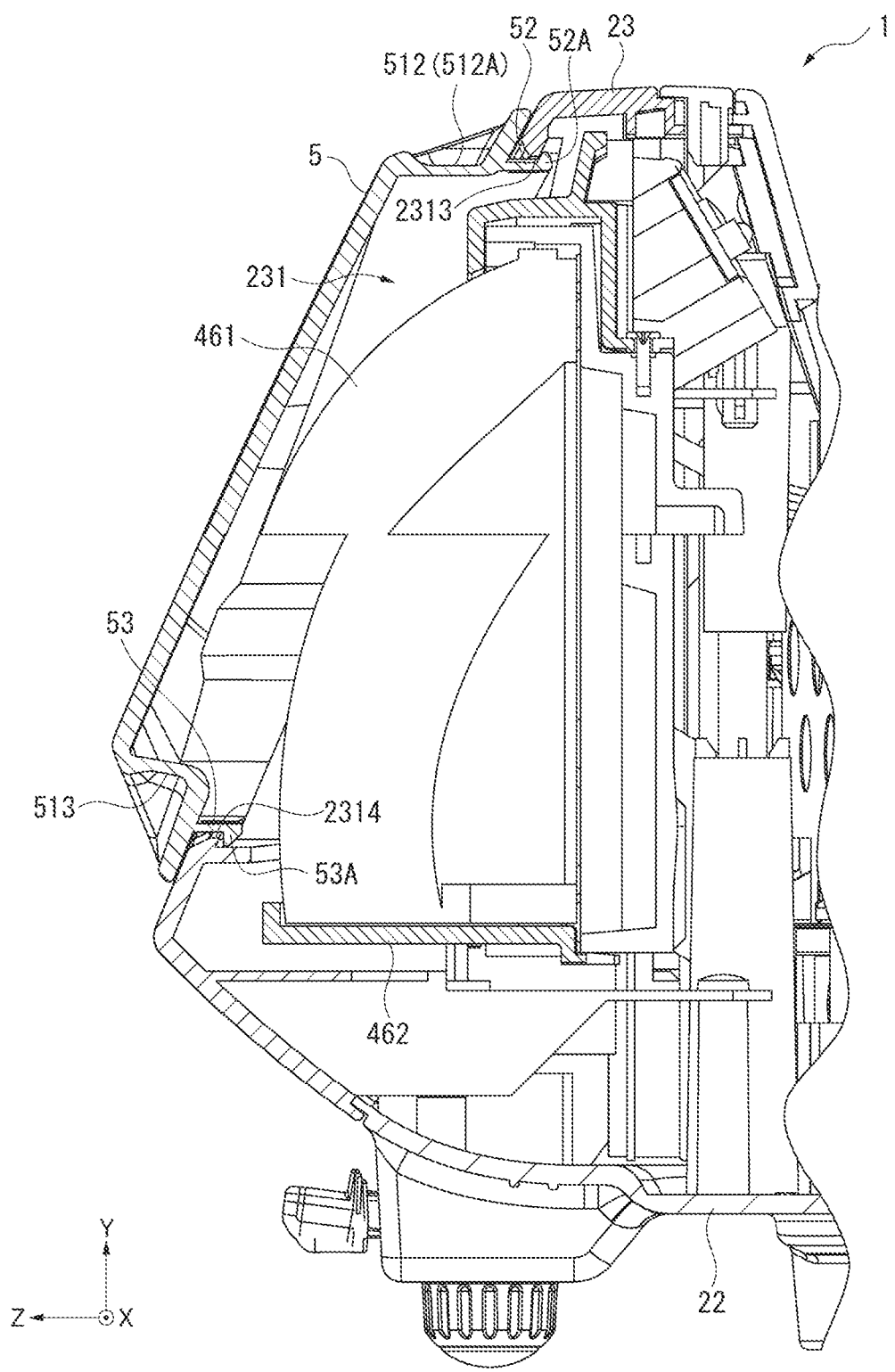
FIG. 7 is a cross-sectional view of the projector to which the lens cap in the first embodiment is attached.

FIG. 7 is a cross-sectional view of the projector 1 to which the lens cap 5 is attached and which is cut along the broken line B-B shown in FIG. 1.

An operator who places, for example, a thumb on the first finger placement portion 512 of the lens cap 5 and a middle finger and a ring finger on the second finger placement portion 513 presses the lens cap 5 into the opening 231 with the rear surface 51B of the lens cap 5 facing the opening 231 in the front case 23. As a result, since the lens cap 5 is a unitary molded part, the tabs 52 to 54 are bent because they are pressed against the standing portion 2312 around the opening 231, whereby the hook-shaped portions 52A to 54A slide along the standing portion 2312, and the lens cap 5 is attached into the opening 213 in the front case 23, as shown in FIG. 7.

How to Detach Lens Cap

How to detach the thus attached lens cap 5 will be described below.

First, the operator who places, for example, a thumb on the first finger placement portion 512 and a middle finger and a ring finger on the second finger placement portion 513 presses at least one of the first finger placement portion 512 and the second finger placement portion 513 to bend the lens cap 5, which is a unitary molded part. Among the tabs 52 to 54 described above, the tab or tabs located on the side where the finger placement portion 512 or 513 to which the pressure has been applied is present disengage from the standing portion 2312 described above. The operator then causes the lens cap 5 to pivot in the direction in which the lens cap 5 moves away from the opening 231 around a pivotal point where the tab or tabs located on the side where the finger placement portion to which no pressure has been applied is present engage with the standing portion 2312. The lens cap 5 can thus be readily detached from the opening 231.

Advantageous Effects Provided by First Embodiment

The projector 1 according to the first embodiment provides the following advantageous effects.

In the present embodiment, in the case where the lens cap 5 is attached into the opening 213, the operator places fingers on the first finger placement portion 512 and the second finger placement portion 513 of the lens cap 5 to apply predetermined pressure to the lens cap 5. The operator can thus bend the lens cap 5 in the direction in which the operator places the fingers on the finger placement portions 512 and 513 (in the Y direction and in the direction opposite the Y direction). As a result, the tabs 52 to 54 can be moved in the direction in which they move away from the inner circumferential edge 2311 of the opening 231, whereby the tabs 52 to 54 can be readily caused to disengage from the inner circumferential edge 2311 of the opening 231. The lens cap 5 can therefore be readily detached from the opening 231 in the exterior enclosure 2 (front case 23) of the projector 1.

On the other hand, when the lens cap 5 is fit into the opening 231, the tabs 52 to 54 are bent and engage with the standing portion 2312, which protrudes from the inner circumferential edge 2311 of the opening 231, whereby the lens cap 5 can be readily attached into the opening 231.

Further, since the body portion 51 and the tabs 52 to 54 of the lens cap 5 are formed integrally with each other, the number of parts, for example, can be reduced as compared with the lens cap of the projector described in JP-A-2009-086199. The productivity of the lens cap 5 can therefore be improved, whereby the manufacturing cost of the projector 1 can be lowered.

Further, since the cutouts 55 to 57 are provided in the positions on the ring-shaped portion 514, with which the tabs 52 to 54 are provided, which sandwich the tabs 52 to 54, the tabs 52 to 54 can be readily bent as compared with a case where no cutouts 55 to 57 are provided. As a result, when the lens cap 5 is attached into the opening 231, the tabs 52 to 54 are allowed to readily engage with the standing portion 2312 around the opening 231. That is, the lens cap 5 can be more readily attached to and detached from the exterior enclosure 2.

Moreover, since the ring-shaped portion 514 is formed along the inner circumferential edge 2311 of the opening 231, the ring-shaped portion 514 of the lens cap 5 is allowed to come into contact with the inner circumferential edge 2311 of the opening 231 when the lens cap 5 is attached into the opening 231. As a result, positional misalignment of the lens cap 5 with the exterior enclosure 2 (opening 231) can be avoided.

Further, since the ribs 5141 to 5143, which protrude outward from the ring-shaped portion 514, are formed on part of the edge portions that form the cutouts 55 to 57, that is, the edge portions opposite the tabs 52 to 54, the ribs 5141 to 5143 come into contact with the standing portion 2312 around the opening 231 when the lens cap 5 is attached into the opening 231. The ribs 5141 to 5143 allow adjustment of the engaging force (locking force) that causes the tabs 52 to 54 to engage with the standing portion 2312. As a result, the lens cap 5 can be held in the opening 231 with appropriate pressure, whereby the lens cap 5 can be more readily attached to and detached from the exterior enclosure 2.

Moreover, since the tabs 52 to 54 of the lens cap 5 are configured to detachably engage with the standing portion 2312 along the inner circumferential edge 2311 of the opening 231, the tabs 52 to 54 of the lens cap 5 can be more readily hooked to the standing portion 2312 than in a case where the tabs 52 to 54 are caused to engage with the inner circumferential edge 2311 of the opening 231. Further, degradation in excellent exterior appearance of the projector 1 that may occur when the lens cap 5 is detached can be suppressed as compared with a case where recesses to which the tabs 52 to 54 of the lens cap 5 are hooked are provided at the inner circumferential edge 2311 of the opening 231.

Since the first finger placement portion 512 and the second finger placement portion 513 are provided in an upper portion (portion on the Y-direction side) and a lower portion (portion on the side opposite the Y-direction side) of the body portion 51, the operator can readily grasp the lens cap 5 by allowing, for example, a thumb and middle/ring fingers to sandwich the body portion 51. Further, when the operator places fingers on the first finger placement portion 512 and the second finger placement portion 513 to press the body portion 51, the first finger placement portion 512 is shifted downward (toward the side opposite the Y-direction side) and the second finger placement portion 513 is shifted upward (toward the Y-direction side), whereby the first tab 52 can be shifted downward (toward the side opposite the Y-direction side) and the second tab 53 and the third tab 54 can be shifted upward (toward the Y-direction side) in response to the placement of the fingers on the finger placement portions 512 and 513 and the grasp of the lens cap 5. The lens cap 5 can therefore be more readily detached from the opening 231.

When the lens cap 5 is fit into the opening 231, the second tab 53 and the third tab 54, the number of which is greater than the number of first tabs 52, which engages with the first standing portion 2313, engage with the inner circumferential edge 2311 (standing portion 2312) of the opening 231 in the lower portion (portion on the side opposite the Y-direction side), which is wider than the upper portion (portion on the Y-direction side), whereby the lens cap 5 can be attached into the opening 231 in a stable manner. On the other hand, since the first tab 52, the number of which is smaller than the number of second tab 53 and third tab 54, is provided in the upper portion (portion on the Y-direction side) of the body portion 51, which is narrower than the lower portion thereof (portion on the side opposite the Y-direction side), the first tab 52, which is located in the upper portion (portion on the Y-direction side), can be more readily caused to disengage than the second tab 53 and the third tab 54, which are located in the lower portion (portion on the side opposite the Y-direction side).

In the operation of detaching the lens cap 5 by causing the lens cap 5 to pivot in such a way that the upper portion (portion on the Y-direction side) of the body portion 51 moves away from the opening 231 around a pivotal point where the lower portion of the body portion 51 and the inner circumferential edge 2311 (standing portion 2312) of the opening 231 engage with each other, the upper portion (portion on the Y-direction side) of the lens cap 5 is readily allowed to move away from the opening 231 because the number of first tabs 52 located in the upper portion (portion on the Y-direction side) is smaller than the number of second tab 53 and third tab 54. The lens cap 5 can therefore be more readily detached from the opening 231.

Further, since the finger placement portions 512 and 513 have the recesses 512A and 513A, which are recessed in the finger placement direction, the operator can readily not only place fingers on the finger placement portions 512 and 513 but also apply pressure to the finger placement portion 512 and 513 in the direction in which the fingers have been placed. The lens cap 5 is therefore allowed to readily bend, whereby the lens cap 5 can be readily detached from the opening 231 formed in the exterior enclosure 2.

Second Embodiment

A projector according to a second embodiment of the invention will next be described.

The projector according to the present embodiment has a function and a configuration similar to those of the projector 1 described above but differs from the projector 1 in terms of the shapes of the front case and the lens cap. In the following description, portions that are the same or roughly the same as the portions having already been described have the same reference characters and will not be described.

Figure 8:
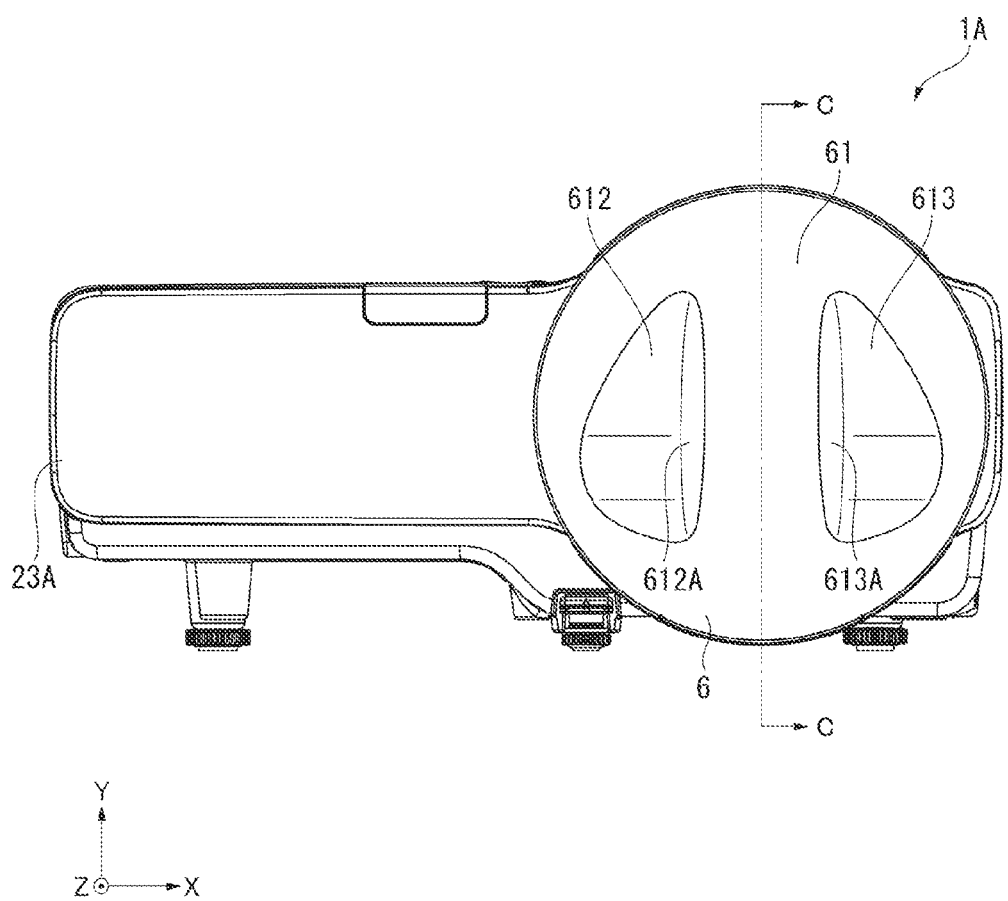
FIG. 8 is a front view of a projector according to a second embodiment of the invention.
Figure 9:
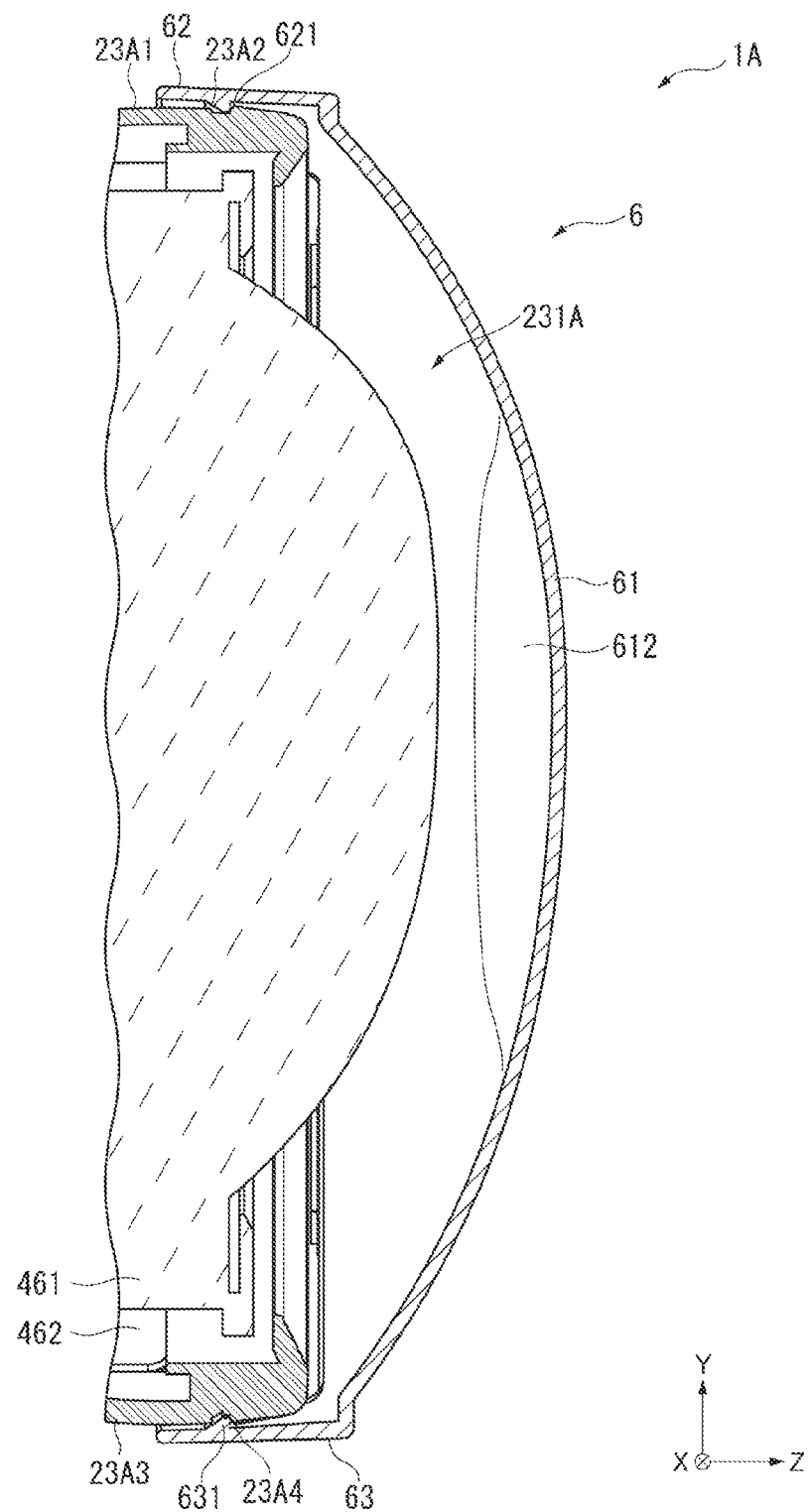
FIG. 9 is a cross-sectional view of the projector to which a lens cap in the second embodiment is attached.

FIG. 8 is a plan view of a projector 1A according to the present embodiment viewed from the side facing the front surface portion 2C, and FIG. 9 is a cross-sectional view of the projector 1A to which a lens cap 6 is attached and which is cut along the broken line C-C in FIG. 8.

The projector 1A according to the present embodiment has the same configuration and function as those of the projector 1 described above except that the front case 23 and the lens cap 5 are replaced with a front case 23A and the lens cap 6 as shown in FIG. 8.

Structure of Opening

The front case 23A has an opening 231A, through which an image projected from the optical unit 4 accommodated in the exterior enclosure 2 passes, and engaging portions 23A1 and 23A3, as shown in FIG. 9. The opening 231A exposes part of the projection optical apparatus 46, that is, one of the lenses that form the projection lens 461 and is located in a position closest to the Z-direction side. The opening 231A is provided along the inner circumferential edge of an end portion of the front case 23A, through which the projection lens 462 protrudes, and the engaging portions 23A1 and 23A3 are located at the outer circumferential edge of the end portion of the front case 23A.

The engaging portions 23A1 and 23A3 have a function of engaging with the lens cap 6 and protrude in the Z direction along the lens barrel 462. The engaging portions 23A1 and 23A3 have recesses 23A2 and 23A4, respectively. Tabs 621 and 631 of the lens cap 6, which will be described later, engage with the recesses 23A2 and 23A4, respectively.

Configuration of Lens Cap

Figure 10:
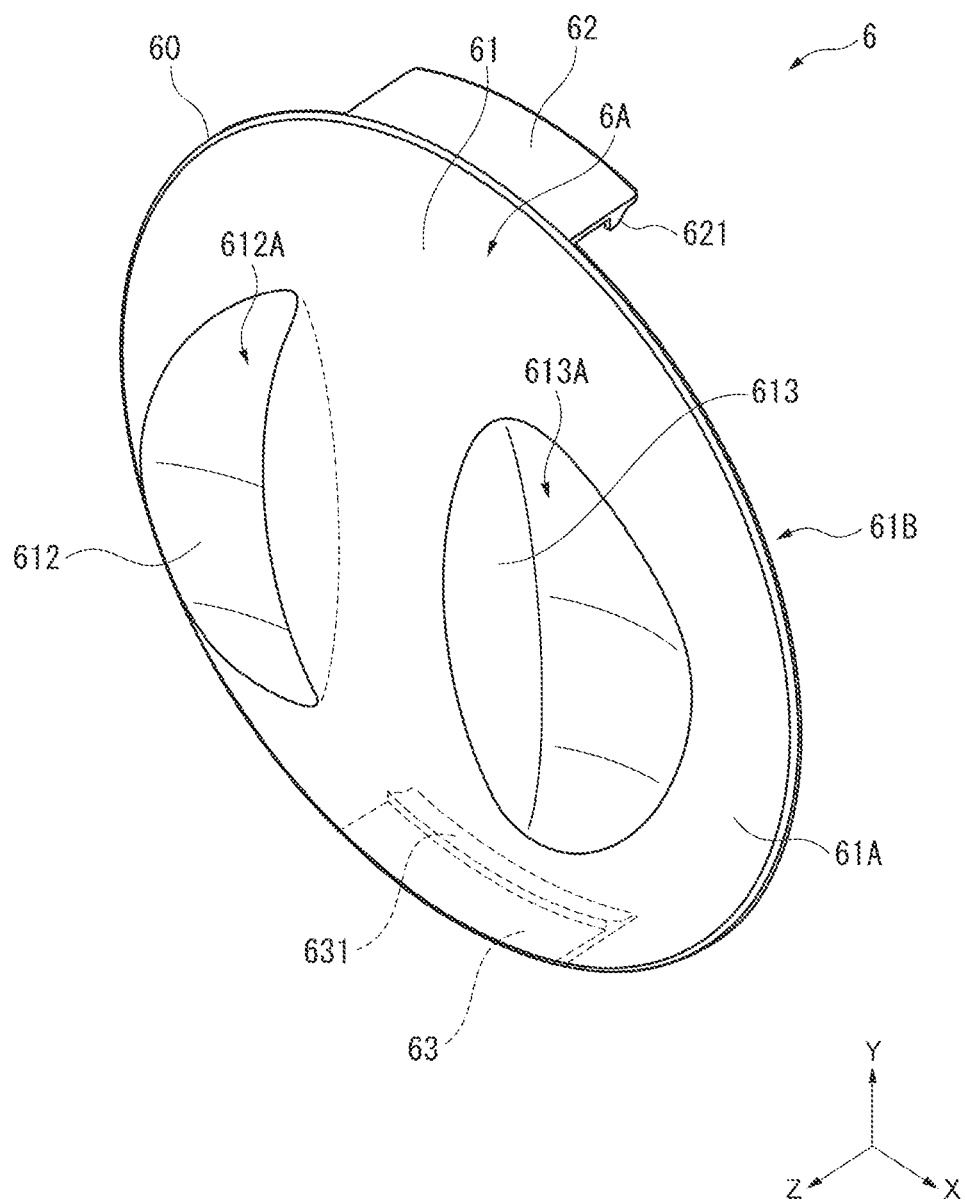
FIG. 10 is a perspective view of the lens cap in the second embodiment viewed from the front side.

FIG. 10 is a perspective view of the lens cap 6 viewed from the side facing the front surface portion 2C.

The lens cap 6 is, for example, a unitary molded part made of polypropylene or any other synthetic resin and is flexible so that it bends when constant pressure is applied thereto. The lens cap 6 is so formed that it has a roughly semicircular shape in correspondence with the shape of the opening plane of the opening 231A described above, as shown in FIG. 10. That is, the lens cap 6 is so dimensioned that it is slightly greater than the opening 231A in the front case 23A.

The lens cap 6 has a body portion 61, which covers the projection lens 461, and a first tab 621 and a second tab 631, which cause the body portion 61 to be locked by the engaging portions 23A1 and 23A3 described above, which are part of the outer circumferential edge around the opening 231A.

The body portion 61 has a shape in which a central portion thereof swells in the Z direction so that the central portion protrudes from an outer edge portion, as shown in FIG. 10. The body portion 61 has a first finger placement portion 612 and a second finger placement portion 613 formed in a surface 61A, which is a surface of the body portion 61 on the Z-direction side.

The first finger placement portion 612, which is one of the finger placement portions and formed in a position in the vicinity of the end of the body portion 61 on the side opposite the X-direction side, has a recess 612A having a roughly arcuate shape that is recessed in the direction in which a finger (thumb, for example) is placed on the first finger placement portion 612, that is, toward the X-direction side.

On the other hand, the second finger placement portion 613, which is formed on the X-direction side, has a recess 613A having a roughly arcuate shape that is recessed in the direction in which fingers (index finger and middle finger, for example) are placed on the second finger placement portion 613, that is, toward the side opposite the X-direction side.

A first protruding portion 62 and a second protruding portion 63, each of which has an arcuate shape and protrudes from an outer circumferential edge 60 of the body portion 61 in the direction opposite the Z direction, are formed on a rear surface 61B of the body portion 61, as shown in FIG. 10.

The first protruding portion 62 and the second protruding portion 63 are portions that engage with the engaging portions 23A1 and 23A3, which are located at the outer circumferential edge around the opening 231A described above, when the lens cap 6 is attached into the opening 231A. The first protruding portion 62 is provided with the first tab 621, and the second protruding portion 63 is provided with the second tab 631.

The first tab 621 is formed on the first protruding portion 62 on the side opposite the Y-direction side and over an entire end portion on the side opposite the Z-direction side. The first tab 621 has a shape bent inward from the first protruding portion 62. The second tab 631 is formed on the second protruding portion 63 on the Y-direction-side and over an entire end portion in the X-direction on the side opposite the Z-direction side. The second tab 631 has a shape bent inward from the second protruding portion 63.

The first tab 621 is provided on the Y-direction side in a view in the direction opposite the direction in which an image is projected out of the projection lens 461, which is covered with the body portion 61, (Z direction), and the second tab 631 is provided on the side opposite the Y-direction side, as shown in FIGS. 9 and 10. Further, the first finger placement portion 612 and the second finger placement portion 613, which are provided in the body portion 61, are arranged, in a view from the side opposite the Y-direction side, in a direction roughly perpendicular to the direction in which the first tab 621 and the second tab 631 having engaged with the recesses 23A2 and 23A4 of the engaging portions 23A1 and 23A3, which are located at the outer circumferential edge around the opening 231A, move away from the recesses 23A2 and 23A4. That is, the direction in which the first tab 621 and the second tab 631 move away from the recesses 23A2 and 23A4 (the Y direction and the direction opposite the Y direction) is perpendicular to the direction in which fingers are placed on the first finger placement portion 612 and the second finger placement portion 613 (the X direction and the direction opposite the X direction).

The operator who places, for example, a thumb on the first finger placement portion 612 and an index finger and a middle finger on the second finger placement portion 613 presses the lens cap 6 against the engaging portions 23A1 and 23A3, which are located at the outer circumferential edge around the opening 231A, with the rear surface 61B of the lens cap 6 facing the opening 231A of the front case 23A. As a result, since the lens cap 6 is a unitary molded part, both the tabs 621 and 631 are pressed against the engaging portions 23A1 and 23A3 and bent. After the tabs 621 and 631 thus slide over the engaging portions 23A1 and 23A3, the tabs 621 and 631 are fit into the recesses 23A2 and 23A4, whereby the lens cap 6 is attached to the engaging portions 23A1 and 23A3 of the front case 23A, as shown in FIG. 9.

How to Detach Lens Cap

How to detach the thus attached lens cap 6 will be described below.

The operator who attempts to detach the lens cap 6 attached to the engaging portions 23A1 and 23A3 and places a thumb on the first finger placement portion 612 and an index finger and a middle finger on the second finger placement portion 613 presses the first finger placement portion 612 and the second finger placement portion 613 to bend the lens cap 6, which is a unitary molded part, so that the tabs 621 and 631 disengage from the recesses 23A2 and 23A4. The lens cap 6 can thus be readily detached from the engaging portions 23A1 and 23A3.

Advantageous Effects Provided by Second Embodiment

The projector 1A according to the second embodiment provides the following advantageous effects as well as the same advantageous effects as those provided by the projector 1 described above.

In the present embodiment, in the case where the lens cap 6 is attached to the engaging portions 23A1 and 23A3, which are located at the outer circumferential edge around the opening 231A, the operator places fingers on the first finger placement portion 612 and the second finger placement portion 613 of the lens cap 6 to apply predetermined pressure to the lens cap 6. The operator can thus bend the lens cap 6 in the finger placement direction (in the X direction and the direction opposite to the X direction). As a result, the tabs 621 and 631 can be moved in the direction in which they move away from the engaging portions 23A1 and 23A3, which are located at the outer circumferential edge around the opening 231A, whereby the tabs 621 and 631 can be readily caused to disengage from the engaging portions 23A1 and 23A3. The lens cap 6 can therefore be readily detached from the opening 231A in the exterior enclosure 2 (front case 23A) of the projector 1A.

Further, when the lens cap 6 is pressed against the engaging portions 23A1 and 23A3, which are located at the outer circumferential edge around the opening 231A, the tabs 621 and 631 are bent and engage with the recesses 23A2 and 23A4 of the engaging portions 23A1 and 23A3, whereby the lens cap 6 can be readily attached into the opening 231A.

Further, since the lens cap 6 is a unitary molded part, the number of parts, for example, can be reduced as compared with the lens cap of the projector described in JP-A-2009-086199. The productivity of the lens cap 6 can therefore be improved, whereby the manufacturing cost of the projector 1A can be lowered.

VARIATIONS OF EMBODIMENTS

The invention is not limited to the embodiments described above, and changes, improvements, and other modifications to the extent that the advantage of some aspects of the invention is achieved fall within the scope of the invention.

In the first embodiment described above, the lens cap 5 is attached to the inner circumferential edge 2311 of the opening 231 formed in the exterior enclosure 2, and in the second embodiment described above, the lens cap 6 is attached to the engaging portions 23A1 and 23A3 located at the outer circumferential edge around the opening 231A formed in the exterior enclosure 2. The invention is, however, not necessarily configured this way. For example, the lens cap may be attached to the lens barrel 462 of the projection optical apparatus 46. In this case, providing the lens barrel 462 with engaging portions with which the tabs 52 to 54 of the lens cap 5 or the tabs 621 and 631 of the lens cap 6 engage allows the attachment of the lens cap 5 or 6 to the lens barrel, whereby the same advantageous effects provided by the embodiments described above can be provided.

In the first embodiment described above, the cutouts 55 to 57 are formed on opposite sides of the tabs 52 to 54. The invention is, however, not necessarily configured this way. That is, the cutouts described above may be omitted as long as the tabs are bent and can engage with the engaging portions when the lens cap is attached. On the other hand, the tabs 52 to 54 are formed in the ring-shaped portion 514, but the invention is not necessarily configured this way. The ring-shaped portion 514 may be omitted, and the tabs 52 to 54 may protrude from the body portion 51.

In the first embodiment described above, each of the ribs 5141 to 5143, which protrude outward from the ring-shaped portion 514, is provided on one of the edge portions that form the corresponding one of the cutouts 55 to 57, that is, on the edge portion on the side opposite the corresponding one of the tabs 52 to 54. The invention is, however, not necessarily configured this way. For example, the ribs 5141 and 5143 may be omitted. Instead, one of the first ribs 5141, which are formed at edges of the first cutouts 55, which sandwich the first tab 52, that is, at edges opposite the first tab 52, may be omitted. On the other hand, the second rib 5142 may instead be formed at each of two edges of the second cutouts 56, which sandwich the second tab 53, at each edge opposite the second tab 53. The same holds true for the third rib 5143.

In the first embodiment described above, the standing portions 2313 and 2314, with which the tabs 52 to 54 engage, are formed along the inner circumferential edge 2311 of the opening 231. The invention is, however, not necessarily configured this way. For example, the standing portion may instead be formed along the entire inner circumferential edge 2311 or only in positions corresponding to the tabs 52 to 54 in such a way that the tabs 52 to 54 can engage with the standing portion or the standing portions. Further, no standing portion may be provided as long as the tabs 52 to 54 can engage with part of the exterior enclosure. In the case where no standing portion is provided, the tabs 52 to 54 may be so formed that they directly engage with the inner circumferential edge 2311.

Instead of the standing portion, recesses into which the tabs 52 to 54 described above are fit may be formed at the inner circumferential edge 2311 of the opening 231. In this case, when the opening 231 has an asymmetric shape in the upward/downward direction, such as the shape described above, a user who attaches the lens cap 5 having roughly the same shape as that of the opening 231 will not accidentally set the lens cap 5 upside down but will correctly attach the lens cap 5 into the opening 231.

In the first embodiment described above, the lens cap 5 is a unitary molded part having a roughly semicircular shape, and the dimension of the first finger placement portion 512 in the X direction is smaller than the dimension of the second finger placement portion 513 in the X direction. The invention is, however, not necessarily configured this way. That is, the shape of the opening and the shape of the lens cap according to the shape of the opening may be other shapes. For example, the opening and the lens cap may have roughly circular shapes, as in the second embodiment. Further, in this state, the first finger placement portion 512 and the second finger placement portion 513 may have recesses having the same shape.

In the first embodiment described above, the first tab 52 is provided in the Y-direction-side end portion of the ring-shaped portion 514, and the second tab 53 and the third tab 54 are provided in the end portion of the ring-shaped portion 514 on the side opposite the Y-direction side. The invention is, however, not necessarily configured this way. That is, the number of tabs disposed in the upper and lower portions of the lens cap can be arbitrarily determined as long as the number of tabs located in the lower portion is greater than the number of tabs located in the upper portion. Instead, the number of tabs located in the upper portion may instead be equal to the number of tabs located in the lower portion. For example, one tab or two tabs may be provided on each of the Y-direction-side end portion and the end portion on the side opposite the Y-direction side.

Further, the tabs are formed in both the upper and lower portions of the lens cap, and the finger placement portions are formed also in the upper and lower portions of the lens cap in correspondence with the tabs. The invention is, however, not necessarily configured this way. For example, the tabs and the finger placement portions may instead be formed on the right and left sides of the lens cap. That is, in a lens cap having each set of a tab and a finger placement portion disposed on the same side, the direction in which fingers are placed on the finger placement portions only needs to be roughly parallel to the direction in which the tabs move away from the engaging portions.

In the first embodiment described above, the first finger placement portion 512 and the second finger placement portion 513 are provided. The invention is, however, not necessarily configured this way. For example, only one of the first finger placement portion 512 and the second finger placement portion 513 may instead be provided. For example, even when only the first finger placement portion 512 is provided, placing a finger on the first finger placement portion 512 to press the first finger placement portion 512 allows the first tab 52 to disengage from the standing portion 2312 along the opening 231, whereby the lens cap 5 can be similarly detached from the opening 231 in the front case 23. Similarly, when only the second finger placement portion 513 is provided, the lens cap 5 can be detached from the opening 231 in the front case 23.

In the second embodiment described above, the tabs 621 and 631 are formed on the end portions of the protruding portions 62 and 63 on the side opposite the Z-direction side and extend across the end portions in the X direction. The invention is, however, not necessarily configured this way. For example, the tabs may instead be formed on part of the end portions in the X direction, or cutouts that sandwich each of the tabs may be formed as in the first embodiment described above. The formation of the cutouts can reduce resistance encountered when the lens cap is attached, whereby the lens cap 6 can be readily attached to and detached from the engaging portions 23A1 and 23A3 of the front case 23A.

In each of the embodiments described above, the first finger placement portions 512 and 612 and the second finger placement portions 513 and 613 have the recesses 512A, 513A, 612A, and 613A, which are recessed in the finger placement direction. The invention is, however, not necessarily configured this way. For example, in place of the recesses, each of the finger placement portions 512, 513, 612, and 613 may be provided with a protrusion on which a finger of the operator is placed or irregularities that increase resistance produced when the operator slides a finger along the finger placement portion. That is, each of the finger placement portions 512, 513, 612, and 613 may have any shape that allows a finger placed thereon to press the lens cap 5 or 6.

In each of the embodiments described above, the optical unit 4 has a roughly L-like shape that follows the rear surface portion 2D and the right side surface portion 2F. The invention is, however, not necessarily configured this way. For example, an optical unit having a roughly U-like shape may instead be employed.

In each of the embodiments described above, each of the liquid crystal panels 453 is a transmissive liquid crystal panel having a light-flux-incident surface and a light-flux-exiting surface as different surfaces. Instead, a reflective liquid crystal panel having a single surface that serves both as the light-incident surface and the light-exiting surface may be used.

In each of the embodiments described above, the projector 1 includes the three liquid crystal panels 453R, 453G, and 453B. The invention is, however, not necessarily configured this way. That is, the invention is also applicable to a projector including two or less liquid crystal panels 453 or a projector including four or more liquid crystal panels 453.

In each of the embodiments described above, each of the liquid crystal panels 453 is a transmissive liquid crystal panel having a light-incident surface and a light-exiting surface as different surfaces. Instead, a reflective liquid crystal panel having a single surface that serves both as the light-incident surface and the light-exiting surface may be used. Further, a light modulator based on a technology other than the liquid crystal technology may be used as long as the light modulator is capable of modulating an incident light flux to form an image according to image information, such as a light modulator using a DMD (digital micromirror device) or any other device using micromirrors.

In the embodiments described above, the light source apparatus 41 includes the light source lamp 411 and the reflector 412, which reflects the light emitted from the light source lamp 411. The invention is, however, not necessarily configured this way. For example, the number of light source lamps may instead be two or three or more. Further, the light source apparatus 41 does not necessarily include the light source lamp 411 and may instead include an LED (light emitting diode), an LD (laser diode), or any other solid-state light source.

The entire disclosure of Japanese Patent Application No. 2014-140252, filed Jul. 8, 2014 is expressly incorporated by reference herein.

What is claimed is:

1. A projector comprising:
a projection optical apparatus including a projection lens that projects an image and a lens barrel that accommodates the projection lens;
an exterior enclosure that accommodates the projection optical apparatus; and
a lens cap that protects the projection lens,
wherein the lens cap has
a body portion that covers at least part of the projection lens exposed through an opening formed in one of the exterior enclosure and the lens barrel, and
a tab that is formed integrally with the body portion and engages with an inner circumferential edge of the opening to lock the lens cap in the opening, and
the body portion has a finger placement portion on which a finger is placed in a direction roughly parallel to a direction in which the tab having engaged with the inner circumferential edge of the opening moves away from the inner circumferential edge.

2. The projector according to claim 1,
wherein the body portion has a ring-shaped portion that is formed along the inner circumferential edge of the opening and inserted into the opening when the lens cap is fit into the opening,
the tab is formed in the ring-shaped portion, and
the ring-shaped portion has cutouts in positions that sandwich the tab.

3. The projector according to claim 2,
wherein a rib that protrudes outward from the ring-shape portion is formed on an edge portion on the side opposite the tab among edge portions that form the cutouts.

4. The projector according to claim 1,
further comprising a standing portion which is located along the inner circumferential edge of the opening and with which the tab engages.

5. The projector according to claim 1,
wherein the tab includes a first tab disposed in an upper portion of the body portion and a second tab disposed in a lower portion thereof in a case where the projector is installed on a predetermined installation surface and the lens cap is fit into the opening, and
the finger placement portion includes a first finger placement portion disposed in the upper portion of the body portion and a second finger placement portion disposed in the lower portion thereof in the case where the projector is installed on the predetermined installation surface and the lens cap is fit into the opening.

6. The projector according to claim 5,
wherein the opening is so formed that the shape thereof has a lower portion larger than an upper portion in the case where the projector is installed on the predetermined installation surface,
the lens cap is shaped in accordance with the opening, and
the number of second tabs is greater than the number of first tabs.

7. The projector according to claim 1,
wherein the finger placement portion has a recess that is recessed in the direction in which a finger is placed on the finger placement portion.

8. A projector comprising:
a projection optical apparatus including a projection lens that projects an image and a lens barrel that accommodates the projection lens;
an exterior enclosure that accommodates the projection optical apparatus; and
a lens cap that protects the projection lens,
wherein the lens cap has
  a body portion that covers at least part of the projection lens exposed through an opening formed in one of the exterior enclosure and the lens barrel, and
  a tab that is formed integrally with the body portion and engages with an inner circumferential edge of the opening to lock the lens cap in the opening, and
wherein
  the tab includes a first tab disposed in an upper portion of the body portion and a second tab disposed in a lower portion of the body portion in a case where the projector is installed on a predetermined installation surface and the lens cap is fit into the opening,
  the body portion has a finger placement portion on which a finger is placed in a direction roughly parallel to a direction in which the tab having engaged with the inner circumferential edge of the opening moves away from the inner circumferential edge, and
  the finger placement portion includes a first finger placement portion disposed in the upper portion of the body portion and a second finger placement portion disposed in the lower portion of the body portion in the case where the projector is installed on the predetermined installation surface and the lens cap is fit into the opening.

9. The projector according to claim 8,
wherein the body portion has a ring-shaped portion that is formed along the inner circumferential edge of the opening and inserted into the opening when the lens cap is fit into the opening,
the tab is formed in the ring-shaped portion, and
the ring-shaped portion has cutouts in positions that sandwich the tab.

10. The projector according to claim 9,
wherein a rib that protrudes outward from the ring-shape portion is formed on an edge portion on the side opposite the tab among edge portions that form the cutouts.

11. The projector according to claim 8,
further comprising a standing portion which is located along the inner circumferential edge of the opening and with which the tab engages.

12. The projector according to claim 8,
wherein the opening is so formed that the shape thereof has a lower portion larger than an upper portion in the case where the projector is installed on the predetermined installation surface,
the lens cap is shaped in accordance with the opening, and
the number of second tabs is greater than the number of first tabs.

13. The projector according to claim 8,
wherein the finger placement portion has a recess that is recessed in the direction in which a finger is placed on the finger placement portion.

14. A projector comprising:
a projection optical apparatus including a projection lens that projects an image and a lens barrel that accommodates the projection lens;
an exterior enclosure that accommodates the projection optical apparatus; and
a lens cap that protects the projection lens,
wherein the lens cap has
  a body portion that covers at least part of the projection lens exposed through an opening formed in one of the exterior enclosure and the lens barrel, and
  a tab that is formed integrally with the body portion and engages with an outer circumferential edge around the opening to lock the lens cap in a position according to the opening, and
wherein
  the tab includes a first tab disposed in an upper portion of the body portion and a second tab disposed in a lower portion of the body portion in a case where the projector is installed on a predetermined installation surface and the lens cap is fit around the opening,
  the body portion has a finger placement portion on which a finger is placed in a direction roughly perpendicular to a direction in which the tab having engaged with the outer circumferential edge around the opening moves away from the outer circumferential edge in a view in a direction opposite the direction in which the image is projected through the projection lens covered with the body portion, and
  the finger placement portion includes a first finger placement portion disposed on a left side of a front surface of the body portion and a second finger placement portion disposed on a right side of the front surface of the body portion.

15. The projector according to claim 14,
wherein the finger placement portion has a recess that is recessed in the direction in which a finger is placed on the finger placement portion.

* * * * *